United States Patent
Ahlstrom et al.

(10) Patent No.: US 12,423,594 B2
(45) Date of Patent: Sep. 23, 2025

(54) STORING VERSIONS OF DATA ASSETS IN KNOWLEDGE GRAPHS

(71) Applicant: BackOffice Associates, LLC, Needham Heights, MA (US)

(72) Inventors: Rex Ahlstrom, Herndon, VA (US); Tyler Warden, Atlanta, GA (US); Kyl Wellman, Aurora, CO (US); Benjamin Woodward, Bremerton, WA (US)

(73) Assignee: BackOffice Associates, LLC, Needham Heights, MA (US)

( * ) Notice: Subject to any disclaimer, the term of this patent is extended or adjusted under 35 U.S.C. 154(b) by 0 days.

(21) Appl. No.: 17/384,547

(22) Filed: Jul. 23, 2021

(65) Prior Publication Data

US 2023/0021309 A1    Jan. 26, 2023

(51) Int. Cl.
*G06N 5/025* (2023.01)
*G06F 16/901* (2019.01)
*G06F 16/9038* (2019.01)
*G06N 5/022* (2023.01)

(52) U.S. Cl.
CPC ......... *G06N 5/025* (2013.01); *G06F 16/9024* (2019.01); *G06F 16/9038* (2019.01); *G06N 5/022* (2013.01)

(58) Field of Classification Search
CPC ............... G06F 17/30; G06F 17/30958; G06F 17/30569; G06F 17/30424; G06F 17/30634; G06F 16/9024; G06F 16/9027; G06F 8/71; G06F 40/197; G06N 5/025
See application file for complete search history.

(56) References Cited

U.S. PATENT DOCUMENTS

| | | | |
|---|---|---|---|
| 8,620,861 B1* | 12/2013 | Uhrhane | G06F 16/1873 707/610 |
| 2004/0133740 A1* | 7/2004 | Prewitt | G06F 9/451 711/112 |
| 2011/0093471 A1* | 4/2011 | Brockway | G06Q 10/10 707/E17.083 |
| 2013/0185252 A1* | 7/2013 | Palmucci | G06F 16/93 707/608 |
| 2017/0199915 A1* | 7/2017 | McNeill | G06F 16/1873 |

(Continued)

OTHER PUBLICATIONS

Specifying architecture of knowledge graph with data graph, information graph, knowledge graph and wisdom graph: Duan, 2017, IEEE, 978-1-5090-5756.*

(Continued)

*Primary Examiner* — Schyler S Sanks
(74) *Attorney, Agent, or Firm* — Fish & Richardson P.C.

(57) ABSTRACT

A method includes storing data in a knowledge graph stored in a database. The knowledge graph is defined by nodes connected by edges, in which a root node of the knowledge graph is connected to a first version node by a first edge. The root node represents a data asset, and the first version node represents a first version of the data asset. A status indicator associated with the first version node has a first state indicating that the first version of the data asset is an editable draft version of the data asset. Responsive to receiving an instruction to publish the first version of the data asset, the state of the status indicator is changed to a second state that indicates that the first version of the data asset is a published version of the data asset.

10 Claims, 14 Drawing Sheets

(56) References Cited

U.S. PATENT DOCUMENTS

| | | | | |
|---|---|---|---|---|
| 2018/0159876 A1* | 6/2018 | Park | | G06F 16/9024 |
| 2018/0329902 A1* | 11/2018 | VonWeihe | | G06F 16/2358 |
| 2019/0026786 A1* | 1/2019 | Khoury | | G06Q 30/0271 |
| 2019/0057165 A1* | 2/2019 | Rosen | | G06F 16/24568 |
| 2019/0102430 A1 | 4/2019 | Wang et al. | | |
| 2020/0153964 A1* | 5/2020 | Copeland | | G06N 5/022 |
| 2021/0224887 A1* | 7/2021 | Zu | | G06F 16/9035 |
| 2021/0334544 A1* | 10/2021 | Minsky | | G06F 11/3075 |
| 2022/0171745 A1* | 6/2022 | Jones | | G06F 16/93 |
| 2022/0292196 A1* | 9/2022 | Bhagi | | G06F 11/1451 |

OTHER PUBLICATIONS

International Search Report and Written Opinion in corresponding Application No. PCT/US2022/036955, dated Sep. 14, 2022, pp. 1-12.

Wikipedia.org [online], "Semantic triple," Jan. 30, 2022, retrieved on Feb. 28, 2023, retrieved from URL <https://en.wikipedia.org/wiki/Semantic_triple>, 3 pages.

\* cited by examiner

Show in a tabular format

Term TE00001: Customer

Version      Published      Changed By
v3               Mar 21, 2021       Jane Doe
v2 (Active       Mar 08, 2021       Anna Crane
v1               Mar 02, 2021       Ryan Lever

FIG. 7

This term is waiting for your review.
Please choose an option.

Endorse | Contest

Version
V4 Published May 14, 2021
View More

Status
Review
Cancel Review
View Endorsement Flow

Critical Data Element

Assigned To
JO Jon Green Author

Sponsors
There are no sponsors

Increase this Term's value

What is a Term?

Apply Categories

Identify Sponsor(s)

Relate to Terms

Relate to Rules

Relate to Policies

Relate to Data Sets

Relate to Systems

Suggested Terms sales prospect                + Add

Version ⊕
📄 V4 Published May 14, 2021 ▼
View More

Status
✓ Accepted
View Endorsement Flow

⬤◯ Critical Data Element

Assigned To
(JO) Jon Green Author

Sponsors
There are no sponsors

Additional Endorsers
There are no Endorsers

Increase this Term's value

What is a Term?

Apply Categories

Identify Sponsor(s)

Relate to Terms

Relate to Rules

Relate to Policies

Relate to Data Sets

Relate to Systems

Suggested Terms sales prospect                + Add

FIG. 8C

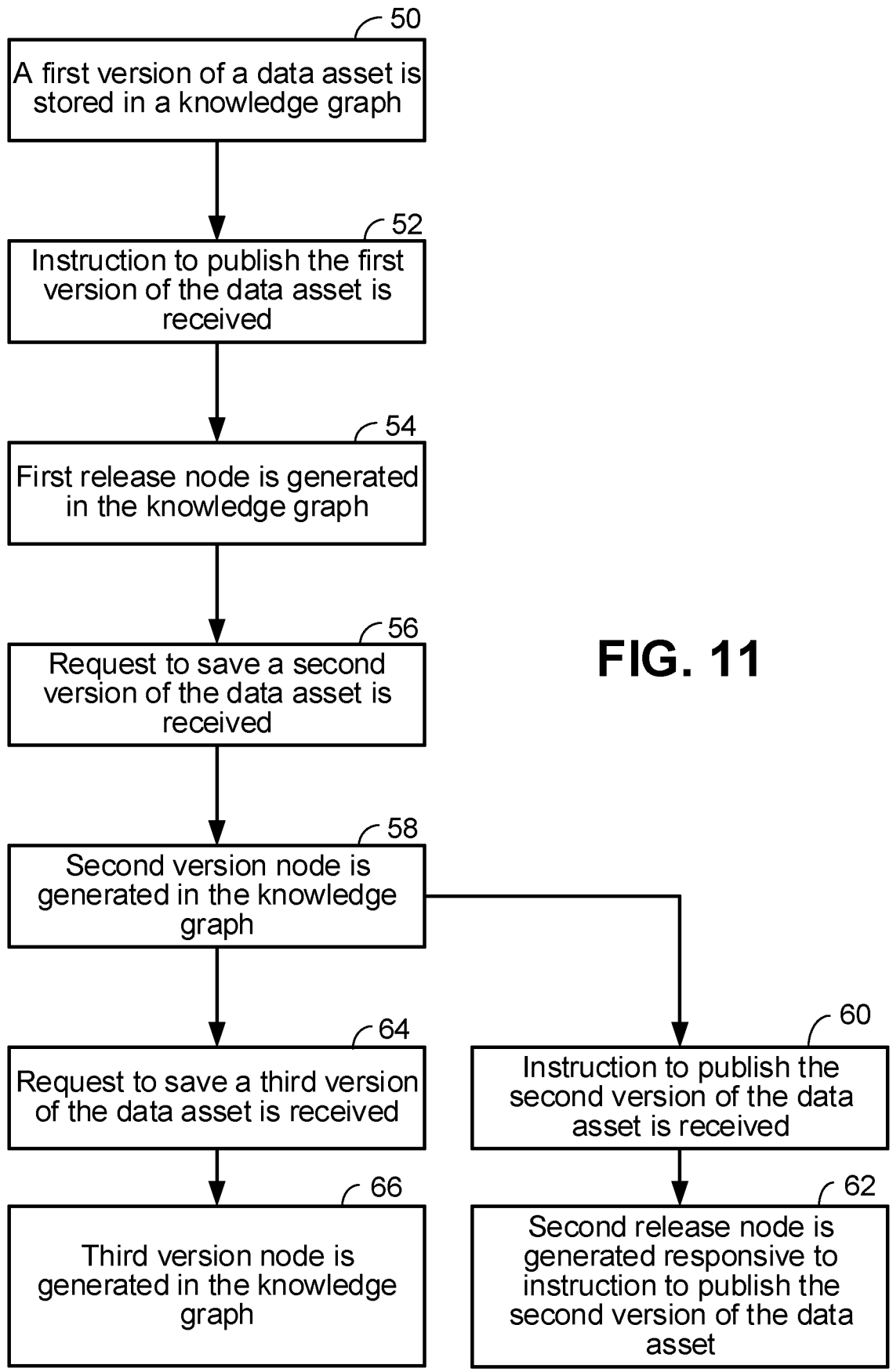

STORING VERSIONS OF DATA ASSETS IN KNOWLEDGE GRAPHS

BACKGROUND

Knowledge graphs are used to store data in which data entities have relationships with one another.

SUMMARY

In an aspect, a method includes storing data in a knowledge graph stored in a database. The knowledge graph is defined by nodes connected by edges, in which a root node of the knowledge graph is connected to a first version node by a first edge, in which the root node represents a data asset and the first version node represents a first version of the data asset, and a status indicator associated with the first version node has a first state. The first state of a particular status indicator indicates that a version of the data asset represented by the version node with which the particular status indicator is associated is an editable draft version of the data asset, and when a particular status indicator has the first state, the corresponding version of the data asset is editable by a user of the knowledge graph. The method includes, by one or more processors, responsive to receiving an instruction to publish the first version of the data asset, changing the state of the status indicator associated with the first version node to a second state, in which the second state of a particular status indicator indicates that a version of the data asset represented by the version node with which the particular status indicator is associated is a published version of the data asset.

Embodiments can include one or any combination of two or more of the following features.

The method includes, responsive to receiving a request to update the data asset represented by the root node of the knowledge graph: generating, in the knowledge graph, by one or more processors, a second version node representing a second version of the data asset; and connecting the second version node to the root node of the knowledge graph by a second edge. A first version identifier is associated with the first version node. Generating the second version node includes assigning a second version identifier associated with the second version node, in which the second version identifier indicates that the second version is a more recent version than the first version. The second version identifier has a value that is higher than a value of the first version identifier.

The method includes, prior to receiving the instruction to publish the first version of the data asset, providing, via a user interface, edit access to the first version of the data asset to a user having edit or approval authority over the first version of the data asset.

When a particular status indicator has the second state indicating that the corresponding version of the data asset is a published version of the data asset, the corresponding version of the data asset is not editable by a user of the knowledge graph.

The method includes, responsive to receiving the request to update the data asset: determining that a status indicator associated with a third version node that is connected to the root node has the first state indicating that a third version of the data asset is a draft version of the data asset; and deleting the third version node or updating the status indicator associated with the third version node to a state indicating that the third version is inactive.

The method includes, responsive to receiving the instruction to publish the first version of the data asset, preventing deletion of the first version node by a user of the knowledge graph.

The instruction to publish the first version of the data asset is based on approval of the first version of the data asset by a threshold number of knowledge graph users having an approval authority over the data asset. The threshold number of users includes more than half of the knowledge graph users having approval authority over the data asset.

The method includes providing access via a user interface to the first version of the data asset. The method includes causing display, in a user interface, of an identity and a publication status of each of the first version of the data asset and the second version of the data asset.

In an aspect, a method includes storing data in a knowledge graph stored in one or more tables of a database. The knowledge graph is defined by nodes connected by edges, in which a root node of the knowledge graph is connected to a first version node by a first edge, in which the root node represents a data asset and the first version node represents a first version of the data asset. The method includes, by one or more processors, responsive to receiving an instruction to publish the first version of the data asset, generating, in the knowledge graph, a first release node connected to the first version node by a first release edge, in which the first release node represents information descriptive of the first version of the data asset.

Embodiments can include one or any combination of two or more of the following features.

The first version of the data asset is not editable by a user of the knowledge graph.

The method includes, responsive to receiving a request to save a second version of the data asset: generating, in the knowledge graph, by the one or more processors, a second version node representing the second version of the data asset; and connecting the second version node to the root node of the knowledge graph by a second edge. The method includes, responsive to receiving an instruction to publish the second version of the data asset, generating, in the knowledge graph, a second release node connected to the second version node by a second release edge. The method includes, without receiving an instruction to publish the second version of the data asset, receiving a request to save a third version of the data asset; responsive to receiving the request to save the third version of the data asset, generating, in the knowledge graph, by the one or more processors, a third version node representing the third version of the data asset; and connecting the third version node to the root node of the knowledge graph by a third edge.

In an aspect, a non-transitory computer readable medium store instructions for causing a computing system to perform operations including storing data in a knowledge graph stored in a database. The knowledge graph is defined by nodes connected by edges, in which a root node of the knowledge graph is connected to a first version node by a first edge, in which the root node represents a data asset and the first version node represents a first version of the data asset, and a status indicator associated with the first version node has a first state. The first state of a particular status indicator indicates that a version of the data asset represented by the version node with which the particular status indicator is associated is an editable draft version of the data asset, and when a particular status indicator has the first state, the corresponding version of the data asset is editable by a user of the knowledge graph. The instructions cause the computing system to perform operations including, responsive to receiving an instruction to publish the first version of the data asset, changing the state of the status indicator associated with the first version node to a second state, in which the second state of a particular status indicator indicates that a version of the data asset represented by the version node with which the particular status indicator is associated is a published version of the data asset.

In an aspect, a computing system includes one or more processors coupled to a memory. The one or more processors and memory are configured to store data in a knowledge graph stored in a database. The knowledge graph is defined by nodes connected by edges, in which a root node of the knowledge graph is connected to a first version node by a first edge, in which the root node represents a data asset and the first version node represents a first version of the data asset, and a status indicator associated with the first version node has a first state. The first state of a particular status indicator indicates that a version of the data asset represented by the version node with which the particular status indicator is associated is an editable draft version of the data asset, and when a particular status indicator has the first state, the corresponding version of the data asset is editable by a user of the knowledge graph. The one or more processors and memory are configured to, responsive to receiving an instruction to publish the first version of the data asset, changing the state of the status indicator associated with the first version node to a second state, in which the second state of a particular status indicator indicates that a version of the data asset represented by the version node with which the particular status indicator is associated is a published version of the data asset.

In an aspect, a non-transitory computer readable medium stores instructions for causing a computing system to perform operations including storing data in a knowledge graph stored in one or more tables of a database. The knowledge graph is defined by nodes connected by edges, in which a root node of the knowledge graph is connected to a first version node by a first edge, in which the root node represents a data asset and the first version node represents a first version of the data asset. The instructions cause the computing system to perform operations including, responsive to receiving an instruction to publish the first version of the data asset, generating, in the knowledge graph, a first release node connected to the first version node by a first release edge, in which the first release node represents information descriptive of the first version of the data asset.

In an aspect, a computing system includes one or more processors coupled to a memory. The one or more processors and memory are configured to store instructions for causing a computing system to perform operations including storing data in a knowledge graph stored in one or more tables of a database. The knowledge graph is defined by nodes connected by edges, in which a root node of the knowledge graph is connected to a first version node by a first edge, in which the root node represents a data asset and the first version node represents a first version of the data asset. The one or more processors and memory are configured to, responsive to receiving an instruction to publish the first version of the data asset, generating, in the knowledge graph, a first release node connected to the first version node by a first release edge, in which the first release node represents information descriptive of the first version of the data asset. The approaches described here can have one or more of the following advantages. Storing past versions of data assets in a knowledge graph, and preventing editing of published version of data assets, enables a rigorously accurate audit trail to be maintained. The publication of a version of a data asset upon approval by a user with approval authority helps to ensure that accurate and appropriate versions are published in the knowledge graph.

The details of one or more implementations are set forth in the accompanying drawings and the description below. Other features and advantages will be apparent from the description and drawings, and from the claims.

BRIEF DESCRIPTION OF DRAWINGS

FIG. 7 is a diagram of a portion of a user interface.
FIGS. 8A-8C are diagrams of a user interface.
FIGS. 10 and 11 are flow charts.

DETAILED DESCRIPTION

We describe here an approach to management of versions of data assets, e.g., in an enterprise data system. Data assets are stored in a knowledge graph. When a data asset is updated, prior versions of the data asset are retained in the knowledge graph, and a new version of the data asset is added to the knowledge graph. The new version of the data asset can proceed through an approval process prior to its addition to the knowledge graph. For instance, the new version of the data asset can be a draft version of the data asset until the approval process is completed. Versions of a data asset that are stored in the knowledge graph are retained even after newer versions of the asset are added. This retention of older versions facilitates auditing of the data system because prior versions, and the changes thereto, are readily available.

Figure 1:
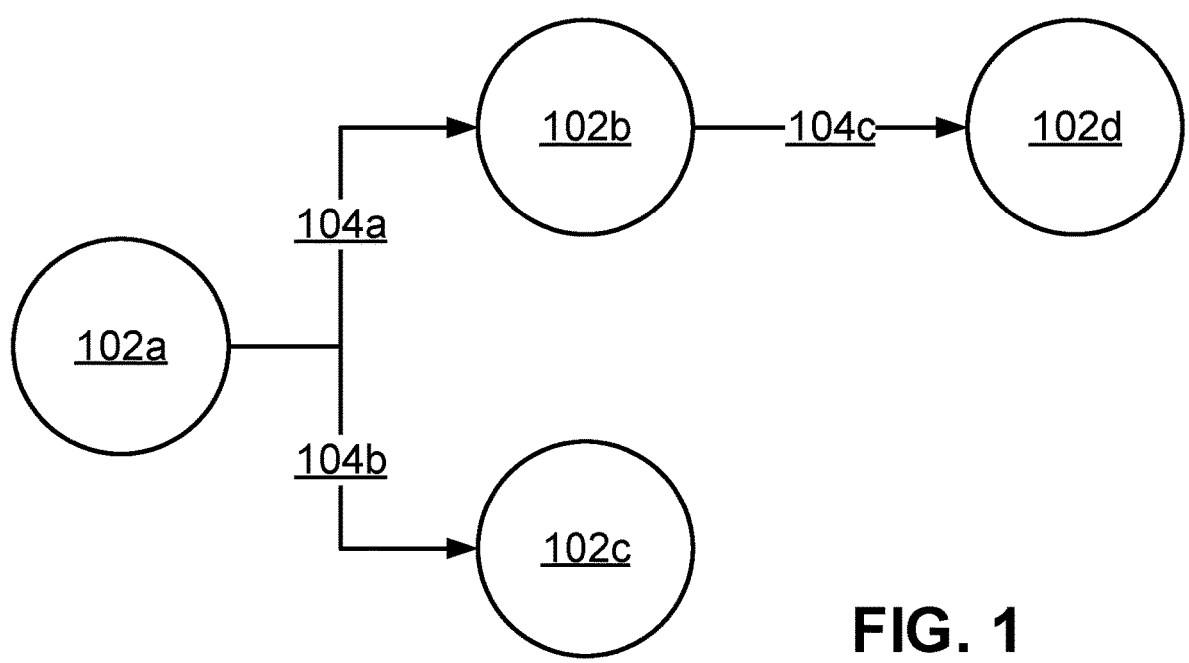
FIGS. 1-5 are diagrams of knowledge graphs.

Referring to FIG. 1, a knowledge graph 100 stores or references entities that are represented as node 102a-102c. Relationships between pairs of entities are represented by edges 104a-104c. A relationship can be direct (e.g., the node 102a is directly related to node 102b, 102d as shown by edges 104a, 104c, respectively) or indirect (e.g., the node 102a is indirectly related to the node 102c via their mutual relationship with the node 102b). The knowledge graph, including the entities and their relationships, are stored in one or more databases 110.

In a specific example, a knowledge graph allows for management of enterprise scale knowledge, such as disparate systems and data and tribal knowledge, by providing a mechanism to traverse relationships among the knowledge entities. Governance resources for the enterprise, referred to as assets, constitute the entities stored in the knowledge graph. Assets are data objects for which multiple versions can be stored in the knowledge graph, with each version being represented by a node of the knowledge graph, as discussed further below. Examples of assets include rules (e.g., standards that assert business structure); policies (e.g., definitions of processes, standards, or other protocols); goals (objectives, such as program or company objectives); initiatives (tasks, such as objectives or projects, to be completed to achieve a goal); visions (guides for distribution, e.g., sharing or reusing, of information to create value that contributes to an objective); programs (data governance programs); missions (short-term focal points for a program or company); systems (sources of record systems for external governance data); fields (fields in a record system, e.g., column names); and datasets (subsets of fields from one or more systems). Assets in a knowledge graph can be assigned one or more identifiers. In some examples, each asset is assigned two identifiers: a globally unique string identifier and a human readable, tenant-scoped identifier.

Other nodes of the knowledge graph (e.g., nodes that do not represent assets) represent resources, which are data objects stored external to the knowledge graph and referenced by a unique identifier. Examples of resources include categories (mechanisms for grouping assets into groups, such as user-defined groups); category values (pre-defined values for a particular category); comments (user comments on a resource); users (users of the knowledge graph or resources stored therein); tenants (client-owned collections of resources); fields (fields in a record system, e.g., column names); and enforcement profiles (standards that assert business structure).

The relationships between assets and resources can be system-defined or user-defined. A relationship can be between an asset version and a resource or between asset versions. Relationships can be created, updated, or deleted by user interaction with a user interface to the knowledge graph. Relationships are directional, directed from a subject to an object, and imply their inverse, e.g., a relationship from subject A to object B implies an additional relationship from subject B to object A. A relationship is characterized as a subject-predicate-object expression (e.g., "TermA [subject] is like [predicate] TermB [object]," "TermC [subject] is_governed_by [predicate] RuleB [object]," or "RuleA [subject] is_related_to [predicate] TermB [object]."). Each relationship is characterized by a name, which is the name of the predicate from the subject's perspective, and an inverse name, which is the name of the predicate from the object's perspective.

Asset versions stored in a knowledge graph have a status as either a published version or a draft version. The status of an asset version is indicated by a status indicator associated with the version, the state (e.g., value) of which indicates the status of the corresponding asset version. For instance, the status indicator can have a state of "true" or "1" to indicate a published version and a state of "false" or "0" to indicate a draft version. A published version of an asset is immutable, meaning that they cannot be changed (e.g., by a user or by the system) once published in the graph. To make a change to an asset, the published version of the asset is maintained in the knowledge graph and a new version of the asset is added to the graph (e.g., a new version node representing the new version is generated). The new version of an asset is added to a knowledge graph initially as a draft version that can be edited. The status indicator associated with the new version has an initial state indicating that the new version is a draft. After an approval process, the draft version is published in the knowledge graph (e.g., the state of the status indicator is changed to indicate publication), meaning that the version can no longer be edited. Prior version(s) of the asset remain stored in the graph even as new versions are added. The retention of prior versions of assets can be useful, e.g., for an audit or for troubleshooting. For instance, during an audit, prior versions of assets are available and changes between successive versions of an asset can be seen, e.g., an effective paper trail of prior versions of the assets of a knowledge graph is maintained.

In some examples, new versions of an asset are created only for certain types of changes. For instance, a new version of an asset can be created when the asset's data or outbound relationships are changed, e.g., for changes to a term's definition, adding a category to a policy, adding an enforcement profile to a rule, adding a relationship between a policy and a term, removing a relationship to another asset, or other such changes. Other types of changes do not involve the creation of a new version of an asset, e.g., a new version is not created when an asset's data or outbound relationships are not changed. For instance, a comment is an inbound relationship to an asset, so no new asset version is created when a comment is added to an asset.

Figure 2:
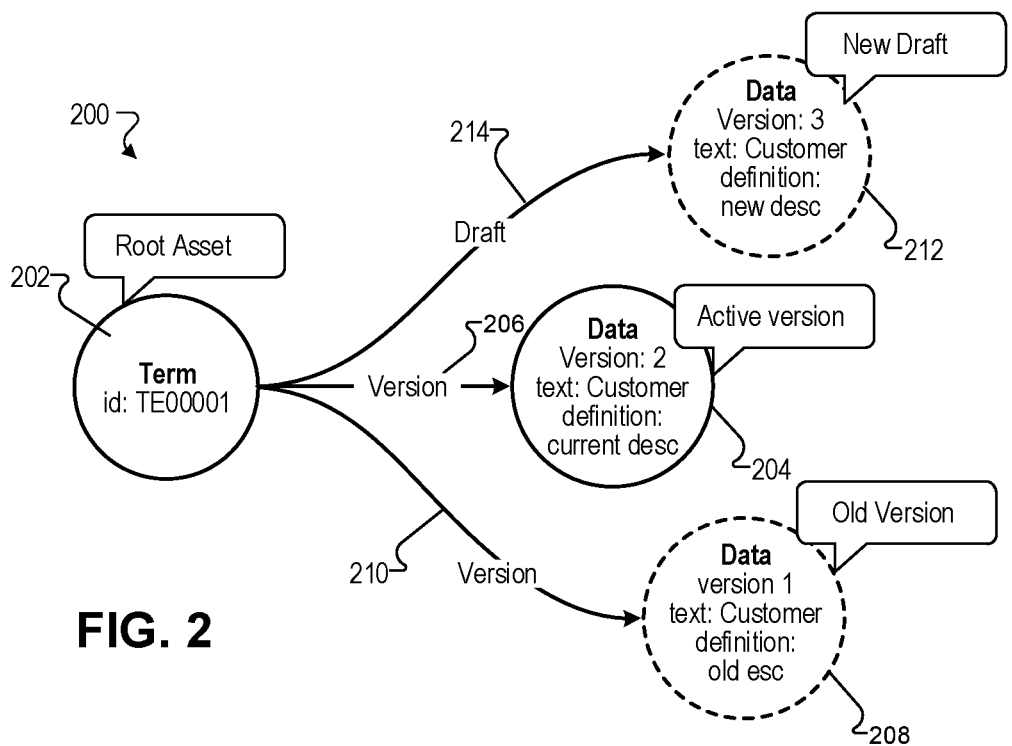

FIG. 2 is a diagram of a knowledge graph 200 storing multiple versions of a data asset (also referred to as an "asset"). The asset is represented by a root node 202. A version node 204 representing a published version of the asset is connected to the root node 202 by an edge 206. A published version of an asset cannot be edited. Metadata associated with the node 204, the edge 206, or both provide information about the status of the version represented by the node 204. For instance, metadata (e.g., a status indicator) associated with the edge 206 indicate that the node 204 represents a published version of the asset (referred to as a "version edge"), e.g., a version of the asset that is not in draft form. Metadata associated with the node 204 include a version identifier ("version: 2") that indicates that the node 204 represents the second active version of the asset. In some examples, metadata (e.g., a status indicator) associated with the node 204 can indicate whether the version is a draft or published version of the asset. For instance, a status indicator can have one state (e.g., "false" or a value of 0) when the version is a draft and a second state (e.g., "true" or a value of 1) when the version is a published version.

A prior version of the asset is represented by a node 208, which is connected to the root node 202 by an edge 210. A prior version of an asset is published and thus cannot be edited. However, a prior version of an asset can be available to a user of the knowledge graph, e.g., an auditor looking to track changes in the asset over time. Metadata (e.g., a status indicator) associated with the edge 210 indicate that the node 208 represents a published version of the asset. Metadata associated with the node 208 include a version identifier ("version: 1") that indicates that the node 208 represents the first version of the asset.

A draft version of the asset is represented by a node 212, which is connected to the root node by an edge 214. A draft version of an asset is an unpublished, editable version of the asset, e.g., a version that is under revision or review. Metadata (e.g., a status indicator) associated with the edge 214 indicate that the node 212 represents a draft version of the asset (referred to as a "draft edge"). Metadata associated with the node 212 include a version identifier ("version: 3") that indicates that the node 212 represents the third version of the asset.

In the example of FIG. 2, the node with the highest numbered version identifier (here, node 212) represents the most recent version of the asset. Here, the most recent version of the asset is a draft version. In some examples, e.g., after the draft version has been approved and before any further drafts have been added, the most recent version of an asset can be a published version. In some examples, the version of an asset are denoted by another identifier, such as a timestamp or datestamp.

Nodes representing versions of an asset, such as the nodes 204, 208, 212, can have other metadata beyond metadata indicative of the status of the version and the version identifier, such as a text description of the version of the asset or other appropriate metadata. In some examples, metadata associated with a node representing a draft version are a description, e.g., a text description, of the nature of the change to the asset that is implemented by that draft.

Figure 3:
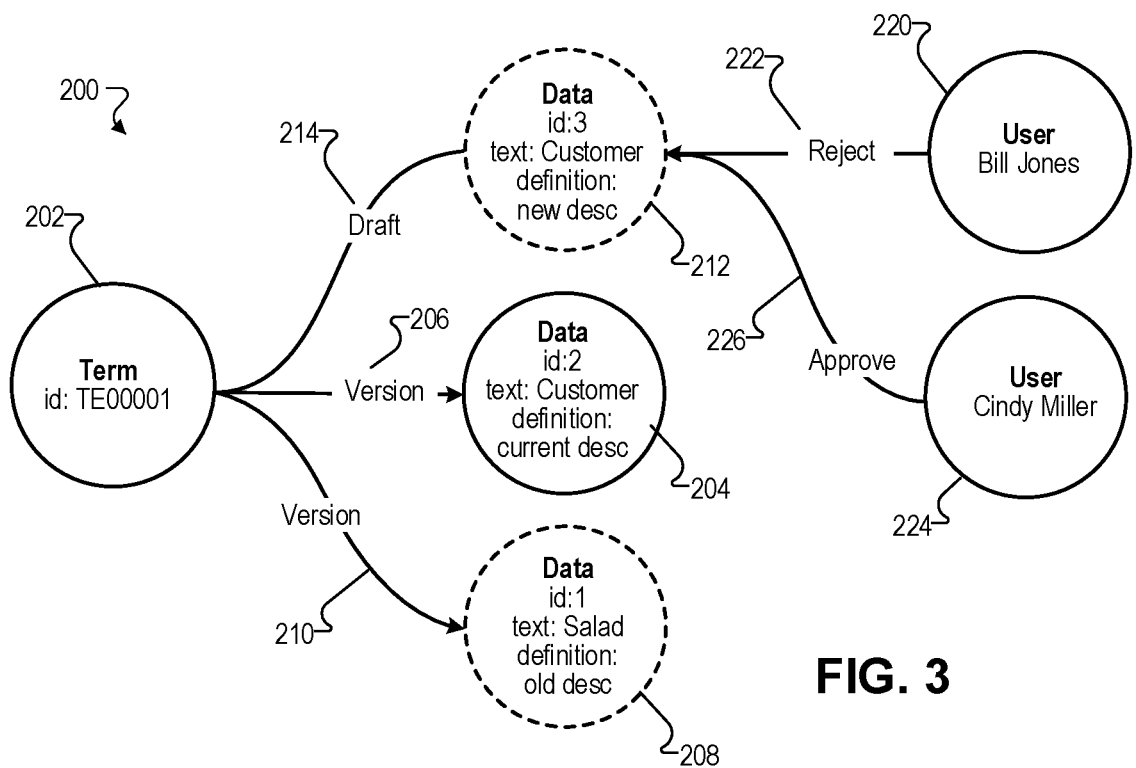

Referring to FIG. 3, for the draft version of the asset, represented by the node 212, to be published in the knowledge graph, the draft version goes through an endorsement process. An endorsement process is a review by one or more sponsors, which are users with authority to review and endorse (e.g., approve) or contest (e.g., reject) a draft version of an asset. A sponsor can be, e.g., a department head, an account manager, an officer of a company, or another person with appropriate authority. In the example of FIG. 3, the draft version of the asset is reviewed by two sponsors, Bill Jones (represented as a node 220 connected to the node 212 by an edge 222) and Cindy Miller (represented as a node 224 connected to the node 212 by an edge 226). Although the sponsors are represented as nodes in FIG. 3, the knowledge graph 200 does not necessarily include nodes representing endorsement sponsors.

The outcome of an endorsement review of a draft version of an asset by a sponsor is either an approval or a rejection of the draft. If and when an endorsement criterion is satisfied by a draft version of an asset, the draft version is published in the knowledge graph, e.g., the metadata (e.g., status indicator) associated with the node or edge (in this example, the edge 214) is updated to reflect the change in status from draft to published version. Examples of endorsement criteria include, e.g., approval by a majority of sponsors, approval by at least half of the sponsors, approval by at least one sponsor, unanimous approval by all sponsors, approval by a particular combination of sponsors, or other suitable criteria.

In the example of FIG. 3, Bill Jones rejected the draft version of the asset, as indicated by metadata associated with the edge 222; and Cindy Miller approved the draft version of the asset, as indicated by metadata associated with the edge 226. If the endorsement criterion in this example is approval by at least half of the sponsors, the draft version of the asset satisfies the endorsement criterion and can be published in the knowledge graph 200.

Figure 4:
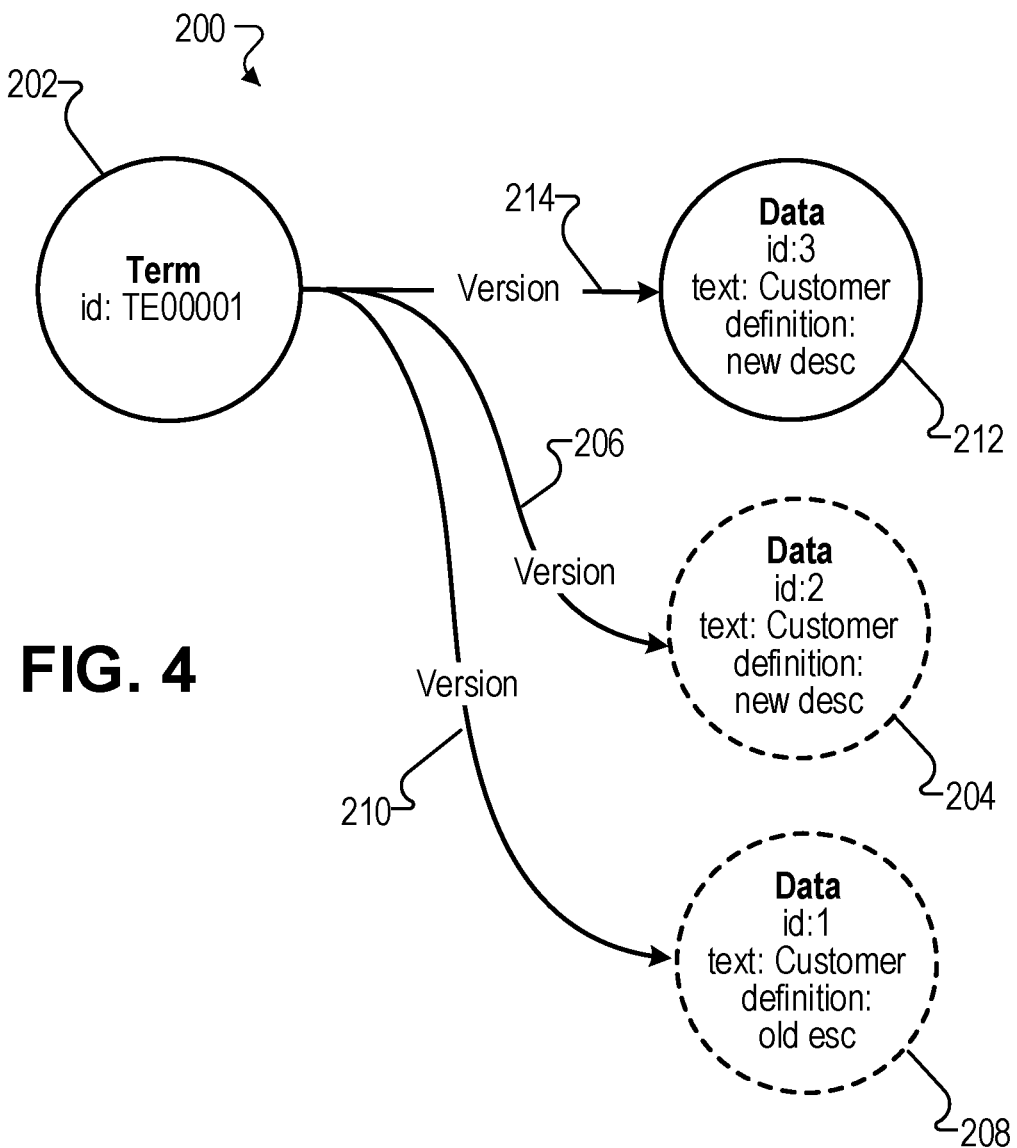

FIG. 4 shows the knowledge graph 200 with the formerly draft version of the asset published as the new active version of the asset. The metadata associated with the edge 214 has been updated to reflect that the corresponding version of the asset is now a published version.

Figure 5:
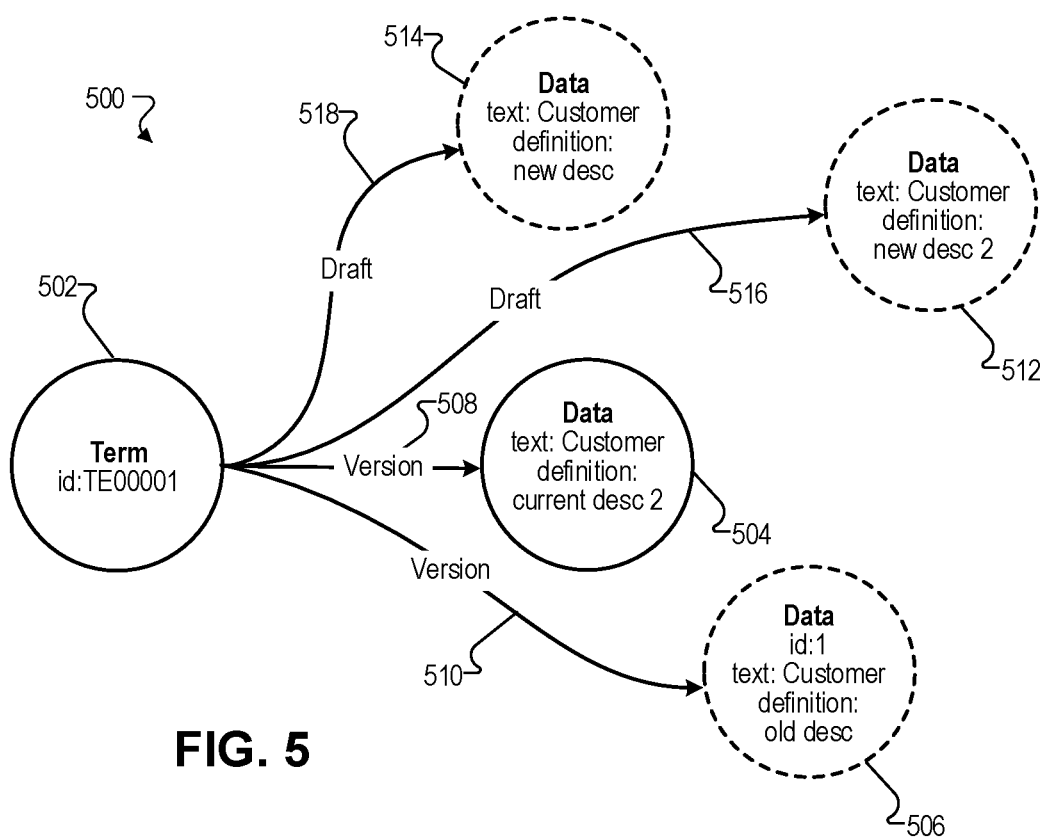

In some examples, only a single draft version of each asset is permitted, and another draft version cannot be created unless an existing draft version is either published or deleted. In some examples, multiple draft versions of an asset can exist. Referring to FIG. 5, a knowledge graph 500 for managing versions of an asset represented by a root node 502 includes two nodes 504, 506 each representing a published version of the asset and connected to the root node 502 by version edges 508, 510, respectively. The node 504 represents the active version of the asset. The knowledge graph 500 also includes two nodes 512, 514 each representing a draft version of the asset and connected to the root node 502 by draft edges 516, 518, respectively. In some examples, coexisting draft versions of an asset are merged upon approval such that the published version of the asset contains aspects of the multiple draft versions. In some examples, when there are multiple draft versions of an asset, the version that is approved first is published, and publication of that version causes all other coexisting drafts to be deactivated (e.g., deleted or marked with a status indicative that they are not eligible for publication and/or can no longer be edited). In some examples, when a first draft version exists and a user creates another draft version, the first draft version is inactivated (e.g., deleted or marked with a status indicator having a state indicating that the draft version that it will not publish and/or can no longer be edited).

Figure 6A:
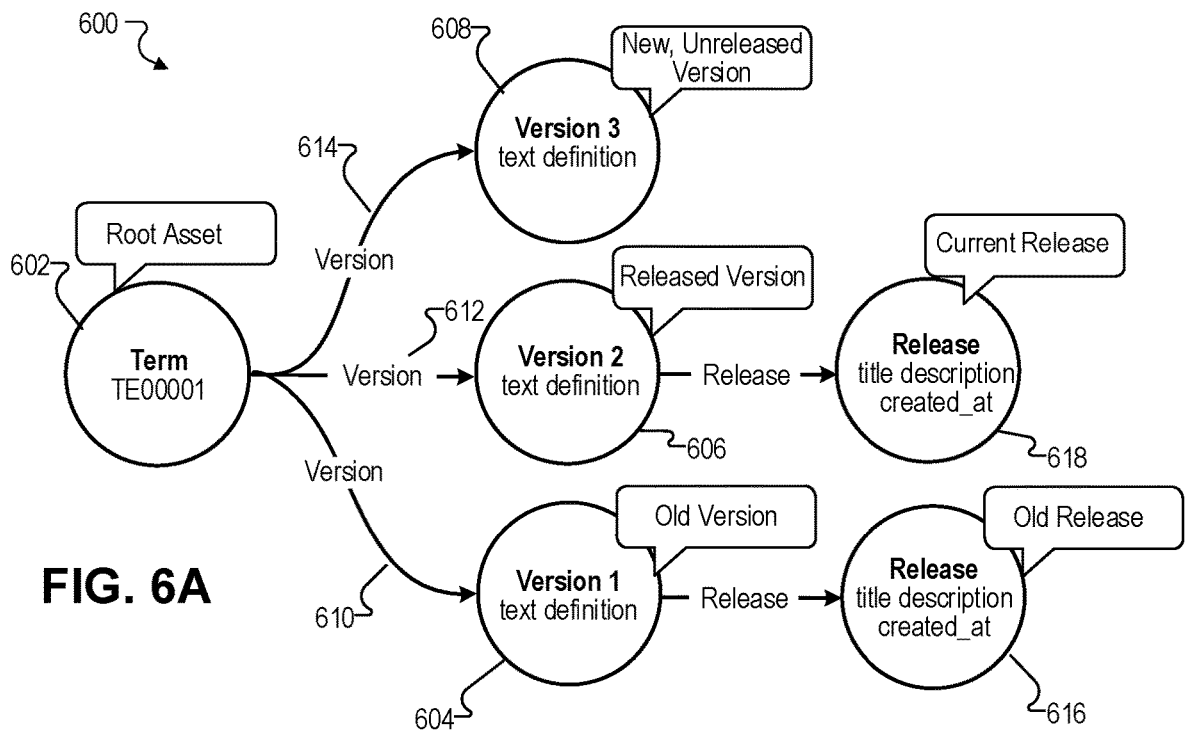
FIGS. 6A and 6B are diagrams of a knowledge graph.

Referring to FIG. 6A, in some examples, a knowledge graph 600 stores multiple releases for an asset rather than storing draft versions of an asset. The asset is represented by a root node 602. Version nodes 604, 606, 608 are connected to the root node 602 by edges 610, 612, 614, respectively. While a draft version of the asset is being edited, a version node is generated in the knowledge graph 600 each time the draft version is saved, e.g., each time a user actively saves the draft version or when the user exits out of an editing interface. The versions of the asset that are stored in the graph are not editable; rather, a new version node is created each time an edited version of the asset is saved. To publish a version of the asset in the knowledge graph 600, e.g., when an edited version is approved, a release node is generated that is connected to the corresponding version node. The presence of a release node connected to a version node in the knowledge graph 600 indicates that the version is published; the lack of a release node connected to a version node in the knowledge graph 600 indicates that the version is unpublished (e.g., has not been through an approval process).

In the example of FIG. 6A, version nodes 604, 606 are connected to release nodes 616, 618, respectively, indicating that the versions of the asset represented by the version nodes 604, 606 are published versions of the asset. The version node 608 does not have a release node connected thereto, indicating that the version of the asset represented by the version node 608 is an unpublished of the asset. In some examples, the version nodes also have status indicators the state of which indicate the status of the corresponding version as a published or unpublished version, e.g., as described above.

In some cases, a knowledge graph can include multiple version nodes without release nodes connected thereto, e.g., multiple unpublished versions of an asset. As a version of an asset is being edited, a version node is created each time each time the version is saved, e.g., when the version is saved automatically or saved manually by a user. The version corresponding to each created version node is immutable; any edits to an existing version of an asset constitute another version that will correspond to another version node when the version is saved. In some examples, a particular one of the versions is released as a canonical version, which creates a release node corresponding to the particular version. By storing a series of interim drafts in the knowledge graph, further detailed information about the evolution of an asset can be accessed, because even edits and changes that were not ultimately incorporated into a published version of an asset are accessible via unpublished version nodes.

Figure 6B:
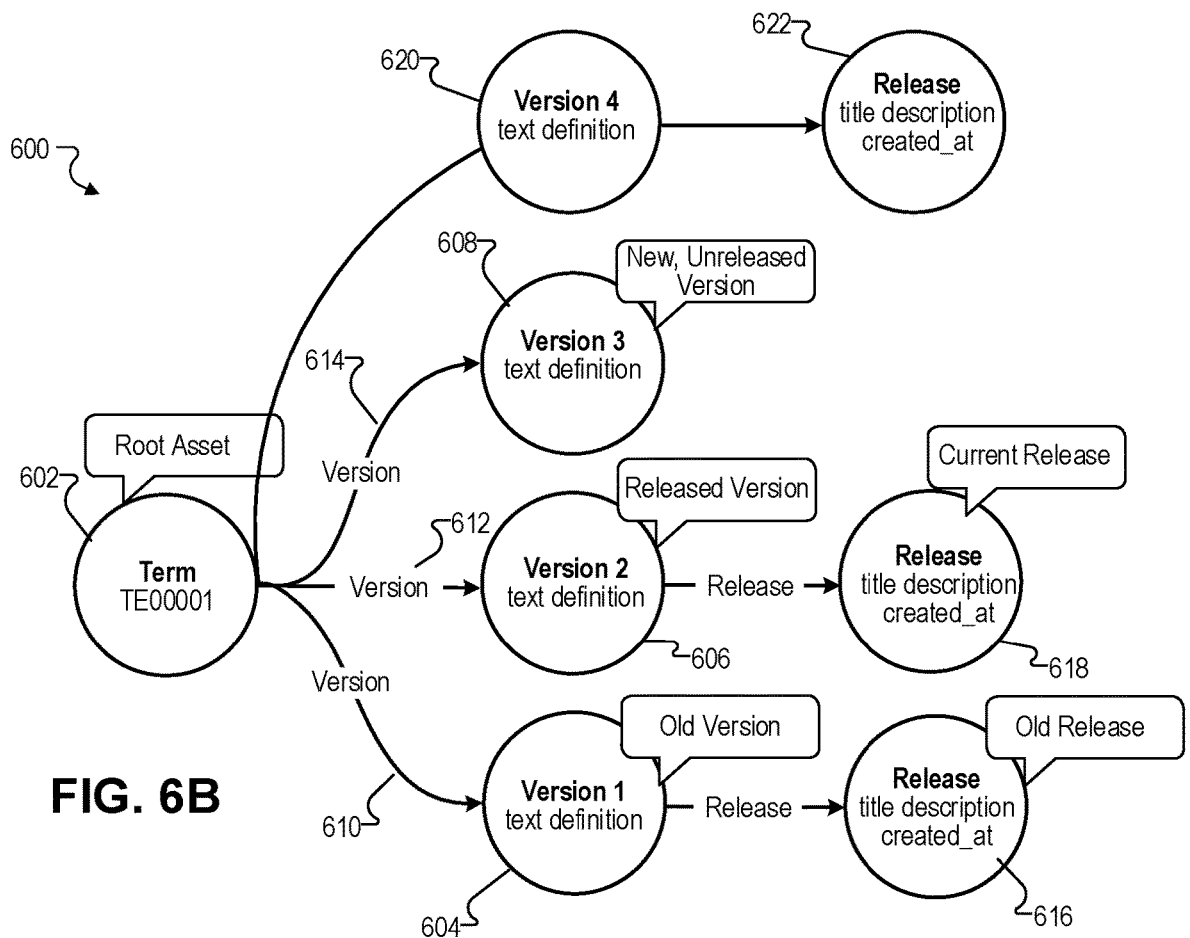

FIG. 6B shows the knowledge graph with an additional version node 620. The version nodes 608 still does not have a release node connected thereto, indicating that the version node 608 represents an unpublished version of the asset that did not proceed through an approval process. For instance, this version may have been generated in the midst of the editing process. The version node 620 has a release node 622 connected thereto; the version of the asset represented by the version node 620 was released as a canonical version of the asset.

In some examples, the existence of a release node is effectively a status indicator indicative of the publication status of the version node to which the release node is connected. In some examples, a release node can include information relevant to the corresponding version of the asset, such as a title or description of the version (e.g., a description of the changes relative to the prior published version).

Referring to FIG. 7, metadata associated with the nodes of a knowledge graph can be presented in a user interface, e.g., in a tabular format. In the example of FIG. 7, three versions of the data asset "Customer" are stored in the knowledge graph. The version identifier, publication date, and name of the user who made the last update to the version are displayed. The display of these metadata provides an overview of the status of the asset, e.g., giving an auditor an understanding of how often an asset has been updated, how recently an asset was updated, who updated an asset, or other information.

Figure 8A:
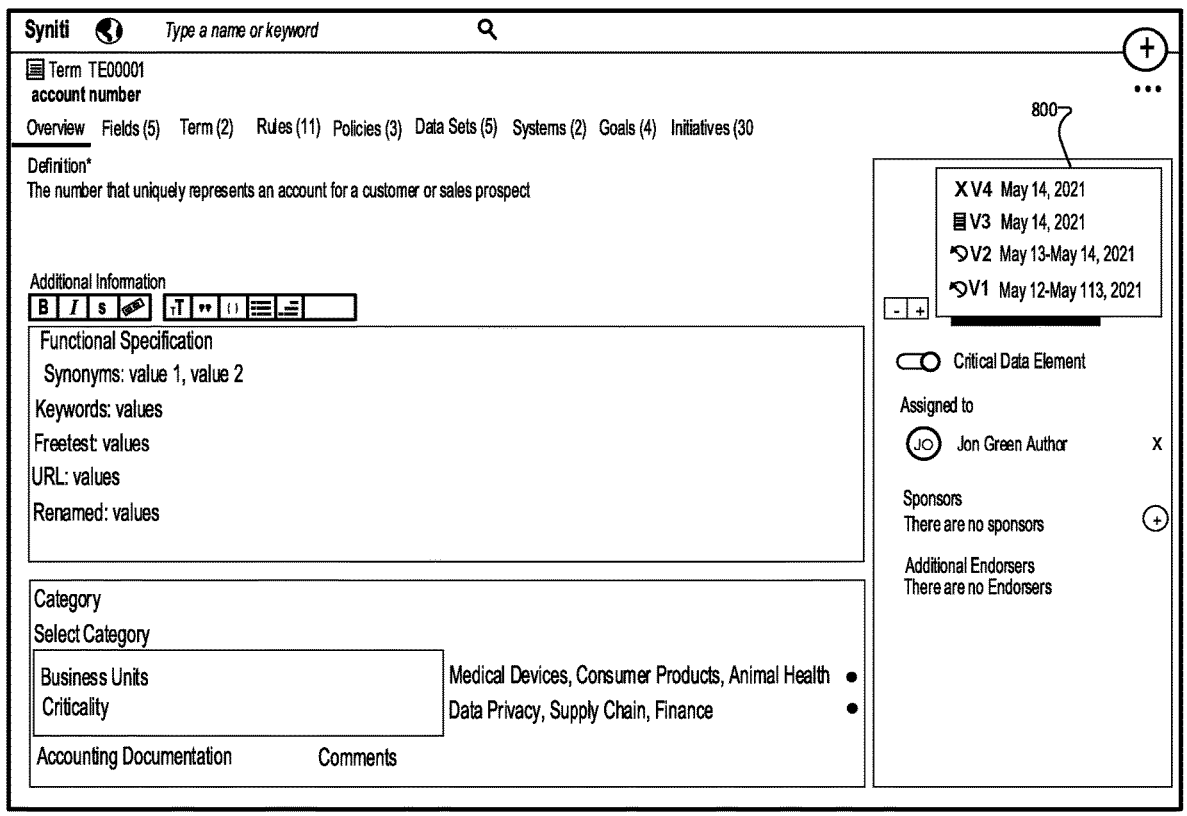

FIGS. 8A-8C show a user interface through which a user can access a current or prior active version of an asset or a draft version of an asset. In the example of FIGS. 8A-8C, the asset is the "account number" term, which is defined as "the number that uniquely represents an account for a customer or sales project." A selection interface 800 allows the user to select the version of the asset he or she would like to access.

FIG. 8B shows an aspect of the user interface that is specific to a person in a sponsor role. The user interface indicates that a draft version of the asset is under review by the sponsor, and presents options to the sponsor to either endorse (e.g., approve) or contest (e.g., reject) the draft. Referring to FIG. 8C, when the draft satisfies its endorsement criterion, the status of the asset changes to published.

Figure 9:
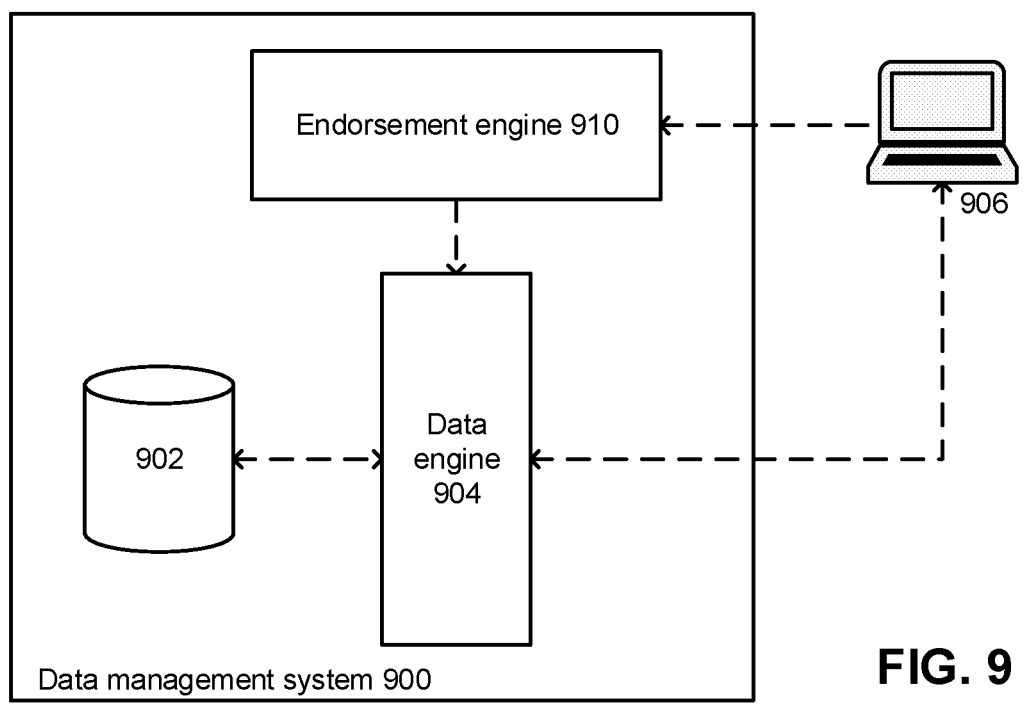
FIG. 9 is a system diagram.

FIG. 9 shows a diagram of an example data management system 900 that implements the approach to knowledge graphs and asset versioning described here. A knowledge graph is stored in a database 902. A data engine 904 is configured to implement the knowledge graph stored in the database 902, e.g., to respond to queries inputted by a user via a user interface 906.

An endorsement engine 910 manages the endorsement process. The endorsement process involves storing a draft asset in the knowledge graph and obtaining approval of the draft asset, e.g., by receiving input from a user interface (the same user interface 906, as shown, or a different user interface). When the obtained approvals satisfy the threshold for publication of the draft asset, the endorsement engine 910 interfaces with the data engine 904 to cause publication of the draft asset in the knowledge graph. In some examples, workflow data associated with the draft version, e.g., identifiers of the users who approved the draft asset, are stored in a workflow database 912. When publishing a draft, the endorsement engine 910 relies on an identifier of the version of the asset to retrieve the corresponding workflow data from the workflow database 912.

Figure 10:
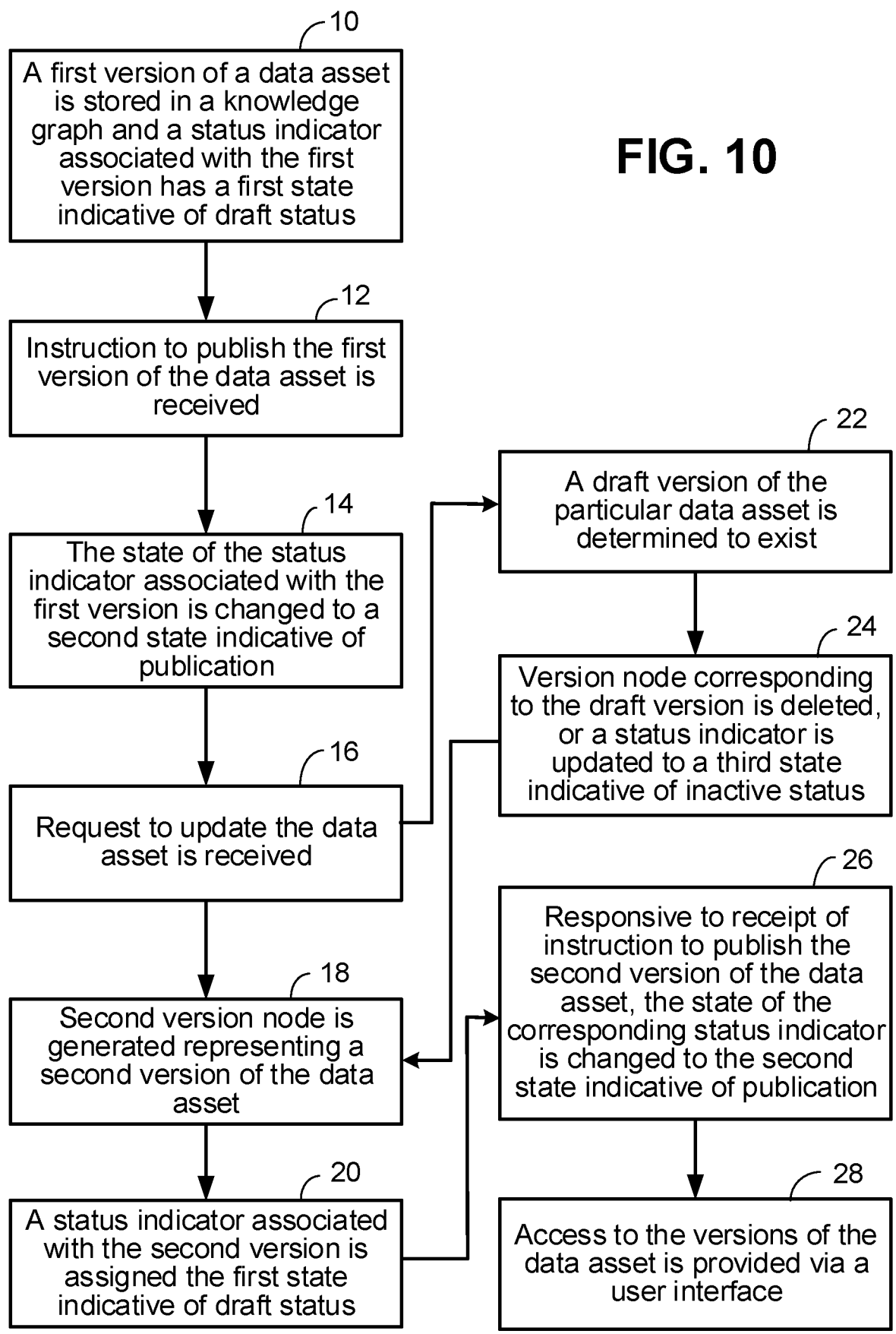

Referring to FIG. 10, in an example process, data are stored in a knowledge graph (10). The knowledge graph is defined by nodes connected by edges, the nodes representing data assets and the edges representing relationships between data assets. A root node of the knowledge graph represents a data asset, such as a rule, policy, goal, initiative, vision, program, mission, system, field, dataset, or other data object stored in knowledge graph. The root node is connected to a first version node by a first edge, where the first version node represents a first version of the data asset. A status indicator associated with the first version node has a first state. The first state of a status indicator indicates that a version of the data asset represented by the version node with which that status indicator is associated is an editable draft version of the data asset that is editable by a user of the knowledge graph. For instance, a user having edit or approval authority over the data asset can be provided with edit access to the first version of the data asset.

An instruction to publish the first version of the data asset is received, e.g., via a user interface (12). The instruction to publish can be based on approval of the first version of the data asset by a threshold number of knowledge graph users having an approval authority over the data asset, such as more than half of such knowledge graph users. Responsive to receipt of the instruction to publish, the state of the status indicator associated with the first version node is changed to a second state (14). The second state of a status indicator indicates that the version of the data asset represented by the version node with which that status indicator is associated is a published version of the data asset that is not editable by a user of the knowledge graph.

A request to update the data asset represented by the root node is received, e.g., via a user interface (16). For instance, the request to update can be provided by an employee tasked with updating the particular data asset. Responsive to receipt of the request, a second version node is generated, by one or more processors, in the knowledge graph (18). The second version node represents a second version of the data asset. The second version node is connected to the root node of the knowledge graph by a second edge such that the root node of the knowledge graph is connected to the first version node by the first edge and to the second version node by the second edge. The first state is assigned to a status indicator associated with the second version node (20), indicating that the second version of the data asset is an editable draft version of the data asset. For instance, a user having edit or approval authority over the data asset can be provided with edit access to the second version of the data asset.

In some examples, responsive to receipt of the request to update the data asset, the one or more processors can determine that a third version node that is connected to the root node has a status indicator that has the first state indicating that a third version of the data asset is a draft version of the data asset, e.g., that a draft version of the particular data asset already exists (22). The third version node is deleted or the status indicator for the third version node is updated to indicate that the third version of the data asset is inactive, e.g., is not eligible for publication or editing (24).

An instruction to publish the second version of the data asset is received, e.g., via the user interface. Responsive to receipt of the instruction to publish, the state of the status indicator associated with the second version node is changed to the second state (26) to indicate that the second version of the data asset is a published version of the data asset that is not editable by a user of the knowledge graph.

Access to the versions of the data asset is provided via a user interface (28). For published versions, the access is read-only access. For draft versions, the access can be edit access or approval access, e.g., depending on a role of the user. The user interface can display an identity and a status (e.g., published or draft) of each version of the particular data asset, along with other metadata such as a time or date of publication or of the last edit.

Referring to FIG. 11, in an example process, data are stored in a knowledge graph (50). The knowledge graph is defined by nodes connected by edges, the nodes representing data assets and the edges representing relationships between data assets. A root node of the knowledge graph represents a data asset, such as a rule, policy, goal, initiative, vision, program, mission, system, field, dataset, or other data object stored in knowledge graph. The root node is connected to a first version node by a first edge, where the first version node represents a first version of the data asset.

An instruction to publish the first version of the data asset is received, e.g., via a user interface (52). The instruction to publish can be based on approval of the first version of the data asset by a threshold number of knowledge graph users having an approval authority over the data asset, such as more than half of such knowledge graph users. Responsive to receipt of the instruction to publish, a first release node is generated in the knowledge graph (54). The first release node is connected to the first version node by a first release edge. The first release node represents information descriptive of the first version of the data asset, such as a title or description of the version (e.g., a description of the changes relative to the prior published version).

A request to save a second version of the data asset is received (56). A second version node is generated in the knowledge graph, the second version node representing the second version of the data asset (58). The second version node is connected to the root node of the knowledge graph by a second edge. In some examples, an instruction to publish the second version is received (60) and a second release node is generated that is connected to the second version node by a second release edge (62). In some examples, without publication of the second version, a request to save a third version of the data asset is received (64), and a third version node is generated and connected to the root node of the knowledge graph by a third edge (66).

The versions of the data asset that are stored in the knowledge graph are not editable, regardless of whether the corresponding version node is connected to a release node. Rather, a new version node is created each time an edited version of the data asset is saved. The presence of a release node connected to a version node indicates that the corresponding version is published, e.g., that the version has proceeded through an approval process.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The program instructions stored in the memory of the panel may store software components allowing network communications and establishment of connections to the data network.

Program instructions stored in the memory, along with configuration data may control overall operation of the system. Server computer systems include one or more processing devices (e.g., microprocessors), a network interface and a memory (all not illustrated). Server computer systems may physically take the form of a rack mounted card and may be in communication with one or more operator terminals (not shown).

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

Particular embodiments of the subject matter have been described. Other embodiments are within the scope of the following claims.

What is claimed is:

1. A method comprising:
   generating a knowledge graph in one or more tables of a database of a computer system, in which the knowledge graph is defined by nodes connected by edges, in which:
   a root node of the knowledge graph is connected to a first version node by a first edge, in which the root node represents a data asset and the first version node is a node in the knowledge graph and represents a first version of the data asset;
   storing, in the knowledge graph, the first version of the data asset that is represented by the first version node in the knowledge graph;
   by one or more processors of the computer system, generating, in the knowledge graph, (i) a first release node in the knowledge graph and (ii) a first release edge in the knowledge graph, in which the first release edge connects the first version node to the first release node, in which the first release node represents that the first version of the data asset represented by the first version node in the knowledge graph is a published version of the data asset that is (i) not editable by a user and (ii) accessible to the user, and in which prior to generation of the first release node, the first version of the data asset is editable by the user;

prohibiting editing of the first version of the data asset that is stored in the knowledge graph;

by the one or more processors:
  accessing the knowledge graph in the database;
  generating a second version node in the knowledge graph, wherein the second version node represents a second version of the data asset;
  generating a second edge that connects the second version node and the root node of the knowledge graph;

storing, in the knowledge graph, the second version of the data asset that is represented by the second version node in the knowledge graph;

by the one or more processors, generating, in the knowledge graph, (i) a second release node and (ii) a second release edge connecting the second release node to the second version node, in which the second release node represents that the second version of the data asset is a published version of the data asset that is (i) not editable by a user and (ii) accessible to the user;

receiving an instruction to generate an audit trail of the data asset;

determining, by the one or more processors and based on comparing the stored first version of the data asset represented by the first release node and the stored second version of the data asset represented by the second release node, a change to the data asset between the first version of the data asset and the second version of the data asset; and returning, by the one or more processors and for an output as the audit trail via a user interface, information indicative of the change to the data asset.

2. The method of claim 1, comprising, prior to receiving the instruction to publish the first version of the data asset, providing, via the user interface, edit access to the first version of the data asset to a second user having edit or approval authority over the first version of the data asset.

3. The method of claim 1, comprising preventing deletion of the first version node by the user.

4. The method of claim 1, in which the instruction to publish the first version of the data asset is based on approval of the first version of the data asset by a threshold number of knowledge graph users having an approval authority over the data asset.

5. The method of claim 4, in which the threshold number of users comprises more than half of the knowledge graph users having approval authority over the data asset.

6. The method of claim 1, comprising providing access via the user interface to the first version of the data asset.

7. The method of claim 6, comprising causing display, in the user interface, of an identity and a publication status of the first version of the data asset.

8. The method of claim 1, comprising:
  without receiving an instruction to publish the second version of the data asset, receiving a request to save a third version of the data asset;
  generating, in the knowledge graph, by the one or more processors, a third version node representing the third version of the data asset; and
  connecting the third version node to the root node of the knowledge graph by a third edge.

9. A non-transitory computer readable medium storing instructions for causing a computing system to perform operations comprising:
  generating a knowledge graph in one or more tables of a database of a computer system, in which the knowledge graph is defined by nodes connected by edges, in which:
    a root node of the knowledge graph is connected to a first version node by a first edge, in which the root node represents a data asset and the first version node is a node in the knowledge graph and represents a first version of the data asset;
  storing, in the knowledge graph, the first version of the data asset that is represented by the first version node in the knowledge graph;
  generating, in the knowledge graph, (i) a first release node in the knowledge graph and (ii) a first release edge in the knowledge graph, in which the first release edge connects the first version node to the first release node, in which the first release node represents that the first version of the data asset represented by the first version node in the knowledge graph is a published version of the data asset that is (i) not editable by a user and (ii) accessible to the user, and in which prior to generation of the first release node, the first version of the data asset is editable by the user;
  prohibiting editing of the first version of the data asset that is stored in the knowledge graph;
  accessing the knowledge graph in the database;
  generating a second version node in the knowledge graph, wherein the second version node represents the second version of the data asset;
  generating a second edge that connects the second version node and the root node of the knowledge graph; and
  storing, in the knowledge graph, the second version of the data asset that is represented by the second version node in the knowledge graph;
  generating, in the knowledge graph, (i) a second release node and (ii) a second release edge connecting the second release node to the second version node, in which the second release node represents that the second version of the data asset is a published version of the data asset that is (i) not editable by a user and (ii) accessible to the user;
  receiving an instruction to generate an audit trail of the data asset;
  determining, based on comparing the stored first version of the data asset represented by the first release node and the stored second version of the data asset represented by the second release node, a change to the data asset between the first version of the data asset and the second version of the data asset; and
  returning, for an output as the audit trail via a user interface, information indicative of the change to the data asset.

10. The computer readable medium of claim 9, comprising:
  generating (i) the first release node in the knowledge graph, and (ii) the first release edge in the knowledge graph responsive to receiving an instruction to publish the first version of the data asset;
  prohibiting editing of the first version of the data asset that is stored in the knowledge graph responsive to receiving the instruction to publish the first version of the data asset;

accessing the knowledge graph in the database, generating the second version node in the knowledge graph, and generating the second edge that connects the second version node and the root node of the knowledge graph responsive to receiving an instruction to update the data asset represented by the root node of the knowledge graph; and generating (i) the second release node, and (ii) the second release edge in the knowledge graph responsive to receiving an instruction to publish the second version of the data asset.

* * * * *